May 18, 1965   C. F. SPANG   3,183,710
METHOD FOR DETERMINING FAT CONTENT IN GROUND MEAT
Filed July 28, 1960   2 Sheets-Sheet 1
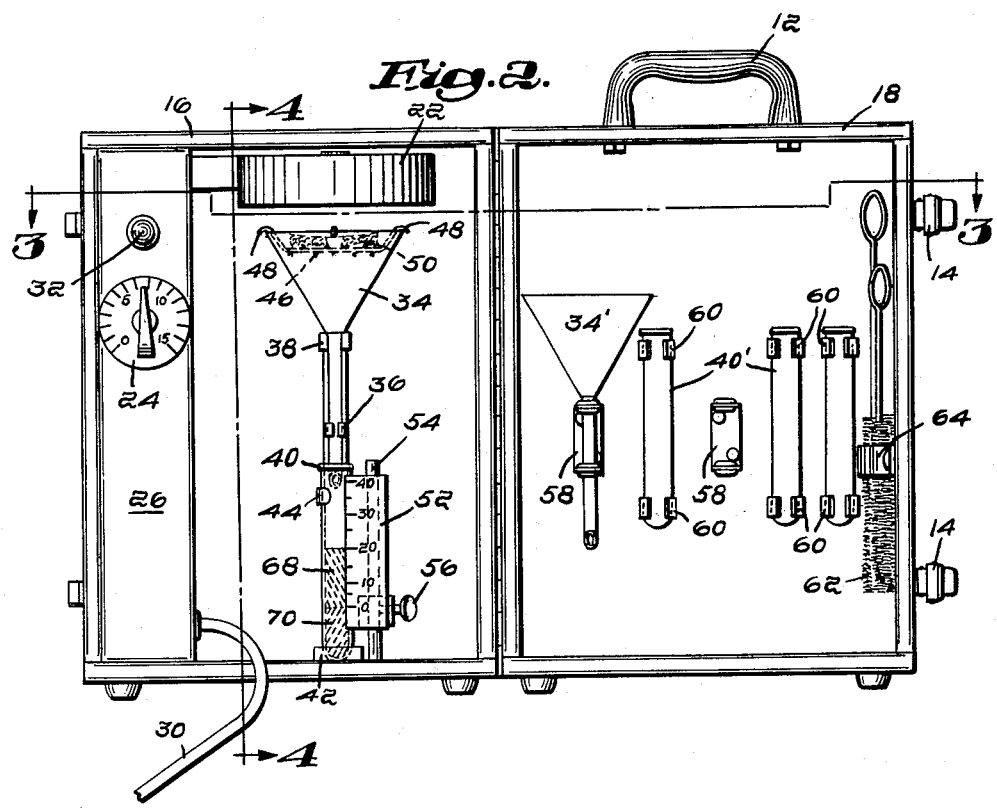
Inventor:
Carl F. Spang,
by Lowrie L. Whittet
Attorneys May 18, 1965 C. F. SPANG 3,183,710
METHOD FOR DETERMINING FAT CONTENT IN GROUND MEAT
Filed July 28, 1960 2 Sheets-Sheet 2
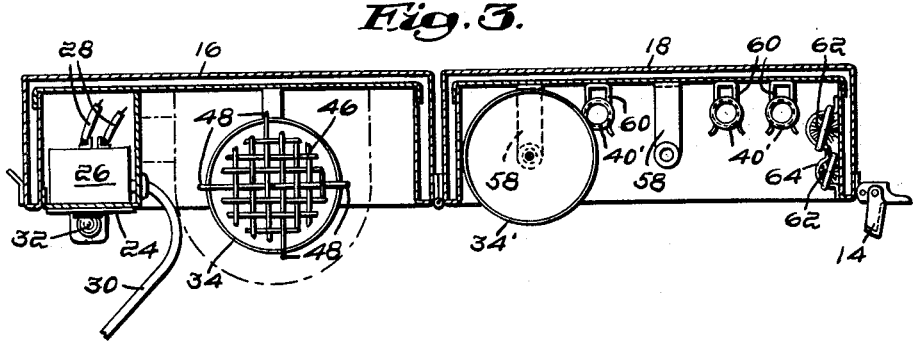
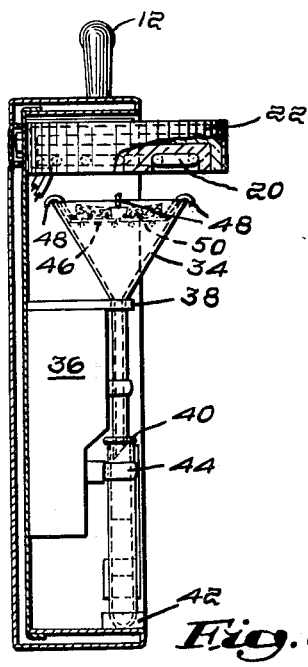
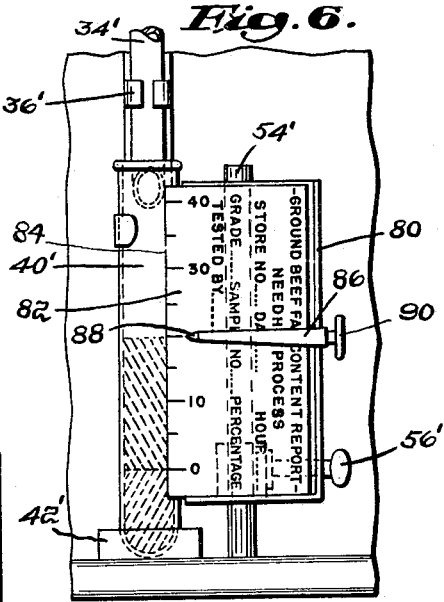

3,183,710
METHOD FOR DETERMINING FAT CONTENT IN GROUND MEAT
Carl F. Spang, Wellesley, Mass., assignor, by mesne assignments, to The Hobart Manufacturing Company, Troy, Ohio, a corporation of Ohio
Filed July 28, 1960, Ser. No. 45,935
1 Claim. (Cl. 73—76)

Ground meat, particularly ground beef as "hamburg," has become a very important commodity in the wholesale market and great quantities of this product are produced and sold to the retail trade. A minor portion of fat is desirable in this product and as the fat content gets lower the price of the product usually increases. However, since the product is sold by weight there is a great tendency to overload is with fat which reduces the quality and is objectionable to the customer. The ground meat can be tested for fat by sending samples to laboratories for that purpose but this procedure is complex, expensive and time consuming. The primary object of my invention resides in the production of a novel and inexpensive method by which the trade can quickly determine the fat content of samples of this ground meat on location.

These and other features and objects will appear more readily upon a detailed description of a preferred embodiment of the invention with reference to the accompanying drawings, in which—

FIG. 1 is a perspective view of a carrying case containing a fat testing kit embodying my invention, FIG. 2 is an enlarged view of the case in open position and showing my fat testing equipment, FIG. 3 is a plan view taken on line 3—3 of FIG. 2, FIG. 4 is a sectional view taken on line 4—4 of FIG. 2, FIG. 5 illustrates a sample meat patty to be tested, FIG. 6 is an enlarged fragmentary view of a modified form of the invention, and FIG. 7 illustrates a record card employed therein.

The novel fat testing kit embodying the invention is so relatively small and simple that it can be readily mounted in a carrying case, thus making the kit conveniently portable. In the accompanying drawings I have illustrated the equipment as mounted in a case 10 having a carrying handle 12 and locking latches 14. The case comprises two half sections hinged together and, as illustrated in FIG. 2, the testing equipment is set up for use in one section 16 of the case and the auxiliary parts required are conveniently mounted in the other section 18. When the case is opened as illustrated in FIG. 2 the equipment and parts are readily available and together with the case provide a small laboratory for convenient fat testing use.

The fat testing equipment shown in section 16 of the case comprises a horizontal and downwardly facing electric heating unit 20 supported within a housing 22 at the top of the case. Timing mechanism 24, mounted in a compartment 26 of the section 16, is connected to the heating unit by wires 28 and has an electric outlet cable 30.

The timing mechanism is of standard construction and includes a switch in the heating circuit which is open when the timer registers zero and is closed when the timer is moved from zero. I have found that a fifteen minute period is ample to melt and extract substantially all the fat from the sample when the various rendering factors are properly coordinated and a fifteen minute timer is therefore herein illustrated as provided for this purpose. The timer circuit also includes a red signal light 32 which is lighted when the rendering operation is proceeding and is adapted to go out when the timer reaches zero. An audible signal for indicating the completion of the rendering operation can also be provided if desired.

Disposed directly beneath the heater unit 20 is a funnel 34 supported in upright position on a bracket 36, the top end of the bracket providing an abutment 38 engaged by the tapering portion of the funnel and supporting it at a predetermined elevation. The bottom end of the funnel extends into a test tube 40 resting on a supporting base 42, the tube being supported within arms 44 carried by the bracket. The top end of the funnel provides a support for a grill 46 having arms 48 for supporting the grill on the funnel, the grill being adapted to support a meat patty sample 50 a predetermined distance beneath and facing the heating unit.

A graduated measuring scale 52 is mounted for longitudinal adjustment on a post 54 fixed to the bottom wall of the case, the post and scale being parallel with the funnel and tube and the scale being disposed directly adjacent to the tube. A thumb screw 56 is provided for securing the scale in adjusted position on the post.

The section 18 of the case is adapted to carry extra parts and equipment as illustrated, these parts including an extra funnel 34′ and extra test tubes 40′ supported by clips 58 and 60. Cleaning brushes 62 supported by clips 64 are also provided.

The invention contemplates the rendering from a predetermined mass of ground meat substantially the entire fat contained therein and the determining of the percentage of fat by collecting and measuring the fat rendered from the sample mass. In accordance with the invention the rendering is performed by subjecting the sample to a broiling heat as illustrated in the drawings. It will be apparent that the time required to complete the rendering operation will depend on various factors such as heat intensity, spacing of the heating unit from the sample, etc. and my invention includes such coordinating of these factors as will uniformly treat successive samples and determine the percentage of fat therein to a considerably accurate degree.

While in the drawings I have illustrated mechanism for supporting the meat patty in horizontal position and subjecting it to heat from above it will be understood that such specific disclosure is primarily for illustrative purposes and that the parts can be otherwise supported if desired.

The sample paty to be tested is of predetermined weight and is preferably molded to somewhat conical shape with a hole 66 through the center as illustrated in FIG. 5. The sample and grill are supported on the top end of the funnel in which position the sample is located a predetermined distance from the heating unit. The heater is turned on by rotating the timer from zero to the fifteen minute position and the timer will automatically open the heating circuit when it returns to zero at the end of such time period. As the fat melts it drains through the meat and primarily through the hole 66 into the test tube 40. At the end of the rendering period the heating circuit is automatically opened, the signal light 32 goes off and an audible signal can be sounded if desired.

The melt drained from the sample ordinarily contains both fat and moisture residue and the fat being lighter forms a column 68 on and above the residue 70. The scale 52 is then moved on the post 54 to a position registering the zero position with the bottom of the fat column and is secured in such position by the thumb screw 56. The reading of the top end of the fat column on the scale thereupon indicates the percentage of fat released from the sample. The procedure is simple and direct and provides a quick and convenient method and apparatus for determining fat content for the purpose described.

A further and important feature of the invention relates to the making of a permanent record sheet for each sample of meat tested and in FIGS. 6 and 7 of the drawings are illustrated mechanism for performing this function and the resulting record sheet. The testing apparatus shown in FIG. 6 is the same as shown in FIG. 2 but in addition thereto is provision for making a full and permanent record of each test. The parts corresponding to those of FIG. 2 are indicated by like reference characters primed.

Mounted for vertical adjustment on the post 54' is a frame 80 adapted to receive and support a card 82 adjacent to the test tube 40' in the predetermined position illustrated. A thumb screw 56' is provided for securing the frame 80 in adjusted position on and along the post. The card 82 is provided with a graduated measuring scale along one longitudinal margin 84 and contains other data relating to the sample and test. The frame 80 is also preferably provided with means for marking on the scale the result of the test, this means being herein illustrated as a bracket 86 adjustable vertically along a longitudinal margin of the frame and carrying a marking pen at its tip end 88 for marking the card at the indicated position on the scale. If desired the bracket can employ a card punch in lieu of the pen 88 and can have a thumb screw 90 for securing the bracket in adjusted position to the frame.

The operation is conducted as already above described and when the rendering is completed the frame 80 is adjusted on the post 54' to a position registering the card scale zero with the bottom of the fat column and is secured in such position by the thumb screw 56'. The bracket 86 is then adjusted to a position wherein the pen 88 is at the top of the fat column and the bracket can be secured in this position by the thumb screw 90. The pen is then operated to mark the card at this position to indicate on the scale the percentage of fat in the sample. It will now be apparent that the card thereafter provides a permanent record of the sample and test.

What I claim is:

A method of determining the fat content of ground meat comprising the steps of obtaining a predetermined mass of the ground meat to be tested, forming such predetermined mass of the meat into a patty having a hole through its center, subjecting said patty to heat under atmospheric pressure conditions for a predetermined time and at a sufficient temperature to melt the fat in said patty to a liquid state, supporting said patty during heating thereof in a position wherein the major portion of the bottom of the patty is free of contact with supporting structure to afford drainage of melted fat away from the patty, collecting the melted fat in a container of predetermined cross section supported to receive all liquids drained from said patty including the melted fat, and measuring the height of the column of fat in said container collected over other liquids removed from the patty to determine the quantity of the fat and thus determine the percentage of fat in the original predetermined mass.

References Cited by the Examiner

UNITED STATES PATENTS

| | | | |
|---|---|---|---|
| 677,035 | 6/01 | Laird | 99—446 |
| 1,158,275 | 10/15 | Phillips | 73—53 |
| 2,097,793 | 11/37 | Howell | 99—446 |
| 2,361,844 | 10/44 | Horner. | |
| 2,622,438 | 12/52 | Campbell | 73—76 |
| 2,828,623 | 4/58 | Benedict | 73—76 |
| 2,869,360 | 1/59 | Stein | 73—76 |

RICHARD C. QUEISSER, *Primary Examiner.*

CHARLES A. CUTTING, ROBERT L. EVANS,
*Examiners.*